United States Patent [19]

Luscombe

[11] 4,063,359
[45] Dec. 20, 1977

[54] VEHICLE MOUNTED BOOM APPARATUS

[76] Inventor: Arthur J. Luscombe, c/o Rubber Dynamics Corporation, Armstrong, Iowa 50514

[21] Appl. No.: 758,772

[22] Filed: Jan. 12, 1977

[51] Int. Cl.² .......................................... F16M 11/04
[52] U.S. Cl. ................................ 30/379.5; 144/34 R
[58] Field of Search ............ 144/34 R, 34 E; 30/379, 30/379.5

[56] References Cited

U.S. PATENT DOCUMENTS 3,565,372  2/1971  Jones et al. ........................ 144/34 R Primary Examiner—Robert C. Watson Attorney, Agent, or Firm—Williamson, Bains, Moore & Hansen

[57] ABSTRACT

A vehicle mounted boom apparatus includes a lower boom member pivotally mounted on the vehicle and an upper boom member pivotally connected to the lower boom member. An elongate chain saw mechanism includes an elongate support arm shiftable mounted on the upper boom member to permit pivoting movement of the chain saw mechanism relative to the upper boom member about a pair of pivotal axes disposed substantially normal to each other. The chain saw mechanism is also provided with power shifting means to rotate the chain saw mechanism about its longitudinal axis relative to the upper boom member.

1 Claim, 5 Drawing Figures

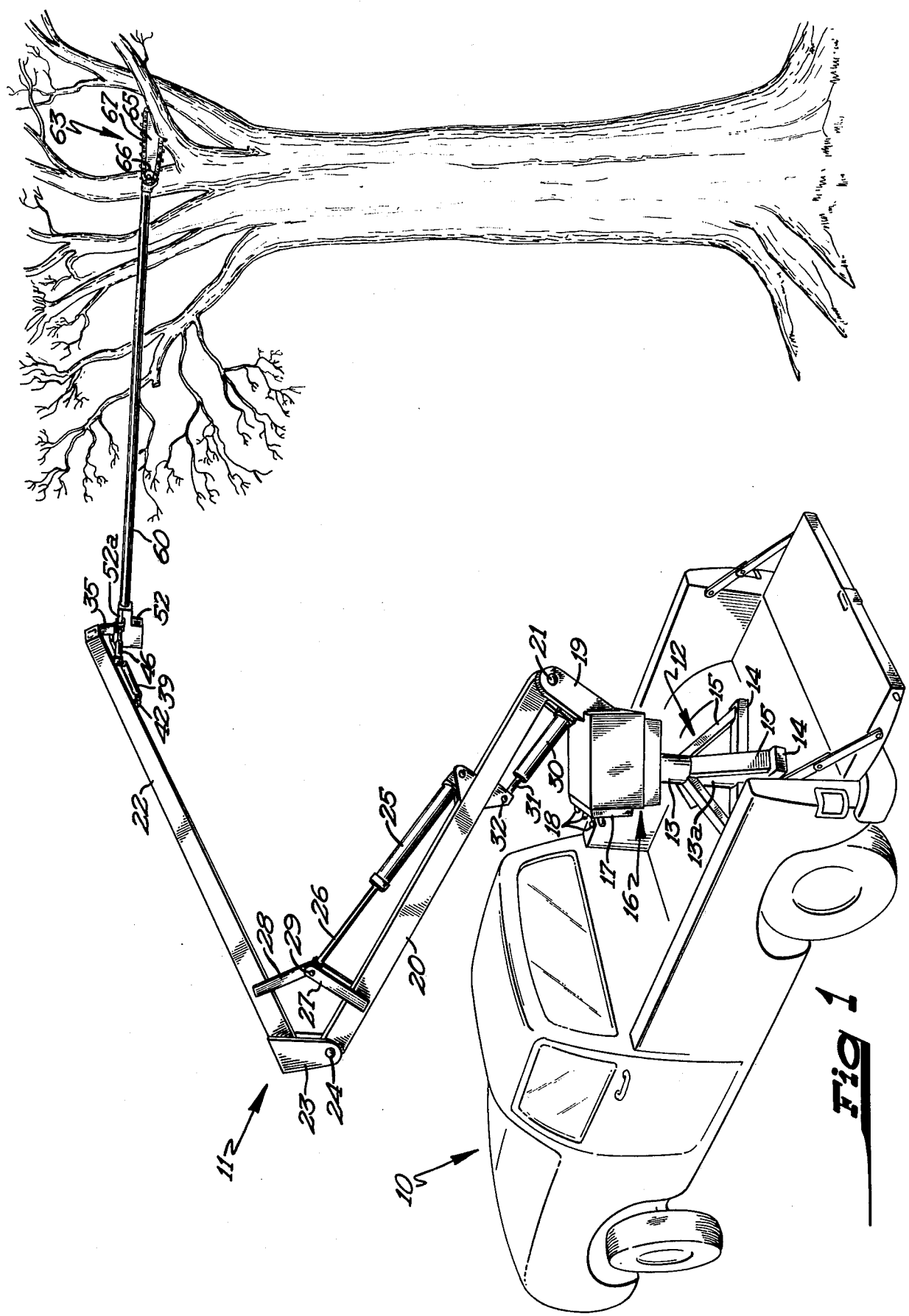

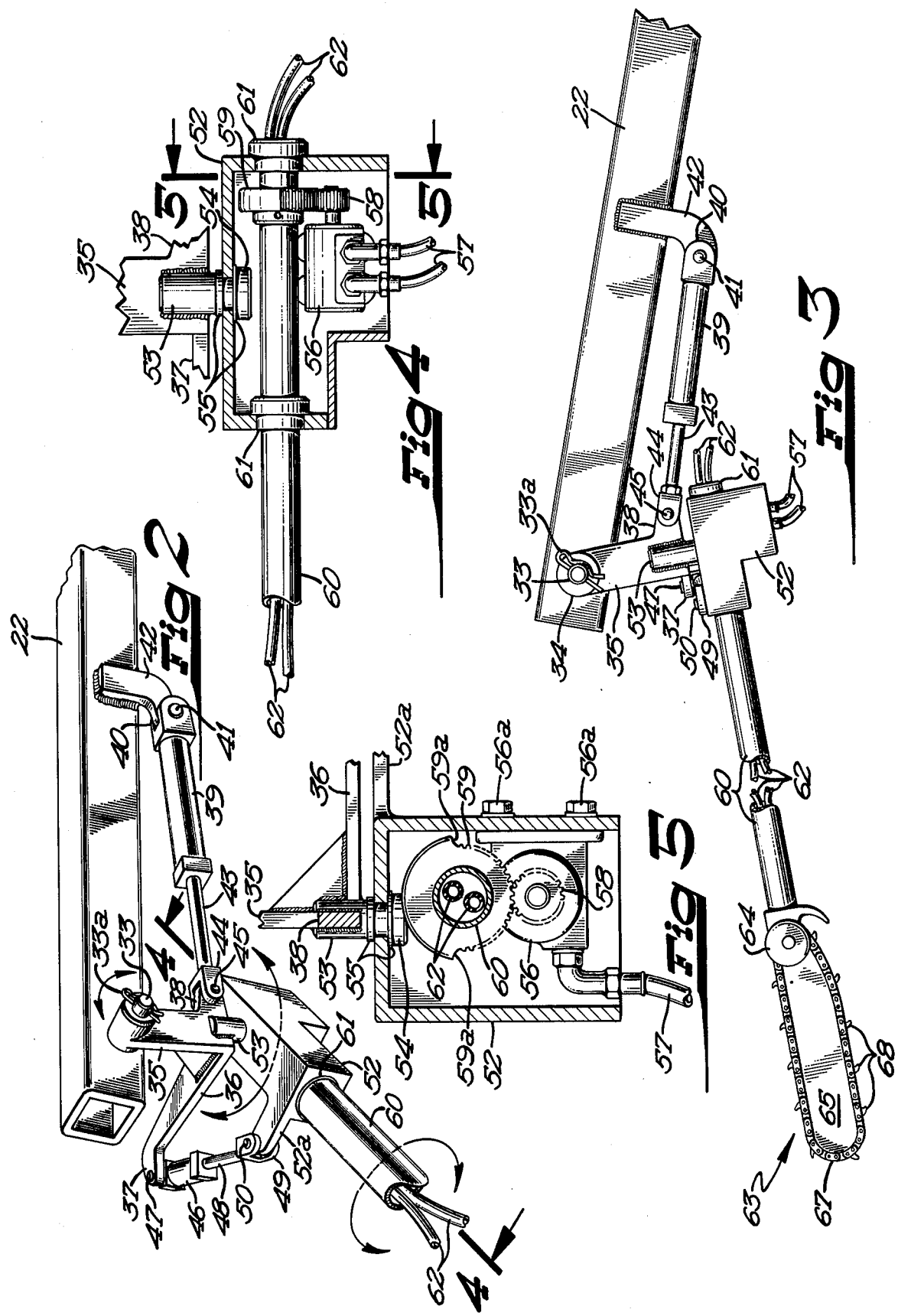

VEHICLE MOUNTED BOOM APPARATUS

SUMMARY OF THE INVENTION

This invention relates to a vehicle mounted boom apparatus and more particularly to a vehicle mounted boom apparatus having a chain saw mechanism mounted thereon and being mounted for shifting movement relative to the boom apparatus.

In many prior art types of vehicle mounted boom apparatuses, a bucket or receptacle is provided for an occupant. This type of prior art apparatus has a wide variety of uses and are often used to trim and prune trees and the like. Typically, the operator manually uses a hand type power saw or power shears during a cutting and pruning operation. In so doing, the operator must also manipulate the boom assembly, as well as operate the power tool. Thus, it is often difficult and sometime dangerous in carrying out such a pruning or cutting operation.

It is, therefore, a general object of this invention to provide a vehicle mounted boom apparatus with a cutting device, such as a chain saw mechanism, which may be operated by an operator by means of controls located adjacent the base of the boom assembly and remotely from the cutting device.

More specifically, the elongate may be shifted relative to the boom assembly about a pair of axes disposed substantially normal to each other and may also be rotated about its own longitudinal axis. With this arrangement, the chain saw mechanism is, in effect, mounted on the boom assembly by a universal connection and its operation may be controlled by an operator standing on the ground.

These and other objects and advantages of my invention will become readily apparent as the following description is read in conjunction with the accompanying drawing wherein like reference numerals have been used to designate like elements throughout the several views.

FIGURES OF THE DRAWING

FIG. 1 is a perspective view of the invention.

FIG. 2 is a fragmentary perspective view illustrating the manner in which the cutting device is mounted on the boom assembly.

FIG. 3 is a side elevational view of a portion of the boom assembly and the cutting device illustrating details of construction thereof.

FIG. 4 is a cross-sectional view taken approximately along line 4—4 of FIG. 2 and looking in the direction of the arrows.

FIG. 5 is a cross-sectional view taken approximately along line 5—5 of FIG. 4 and looking in the direction of the arrows.

DESCRIPTION OF THE PREFERRED EMBODIMENT OF THE INVENTION

Referring now to the drawings and more specifically to FIG. 1, it will be seen that one embodiment of the novel vehicle mounted boom apparatus is there shown. The apparatus includes a convention vehicle, such as the pickup truck 10, having a scissors boom assembly 11 mounted on the truck bed. The scissors boom assembly 11 includes a support structure 12 comprised of a movable vertical post 13 and a fixed vertical post 13a, the latter being mounted on horizontal base members 14, which are secured to the pickup truck bed. A plurality of angular braces 15 extend between and are rigidly interconnected to the outer end of the base numbers 14 and the upper end of the fixed post 13a. A control housing 16 is mounted on the upper end portion of the movable vertical post 13 and contains a plurality of components used in operating the boom structure. These components include wet cell storage batteries, hydraulic fluid reservoir, and hydraulic pumps, all of which are conventional with scissors type boom assemblies and all of which are not shown. The control housing 16 is also provided with a control panel 17, having a plurality of control handles or switches 18 mounted thereon. The control panel may be operated by an operator standing on the ground adjacent to the pickup truck.

A pair of spaced apart substantially parallel arms 19 are rigidly connected to the control housing 16 and project angularly upwardly therefrom. An elongate lower boom member 20 has its lower end positioned between and pivotally connected to the outer ends of the arms 19 by means of a pivot 21. The boom assembly 11 also includes an elongate upper boom member 22, which is provided with a pair of spaced apart substantially parallel arms 23 at the lower end of the upper member and which project angularly therefrom. The lower boom member is pivotally connected to the outer ends of the arms 23 by means of a pivot 24.

Means are provided for shifting the upper and lower boom members relative to each other, and this means includes a hydraulic cylinder 25, which is connected to a bracket carried by the lower boom member, as best seen in FIG. 1. Hydraulic cylinder 25, which is of the double acting type, has a piston movable therein, to which is connected a poston rod 26. The outer end of the poston rod 26 is pivotally connected to crank arms 27, fixedly connected to the outer end portion of the lower boom member 20 and to a crank arm 28 fixedly connected to the lower end portion of the upper boom member 22.

Means are also provided for shifting the lower boom member 20 relative to the control housing 16 and this means includes a double acting hydraulic cylinder, which is secured to the arms 19 and projects upwardly therefrom. Cylinder 30 is provided with a poston movable therein, to which is connected a piston rod 31, the latter being connected to a bracket 32, carried by the lower boom member 20 adjacent to the lower end portion thereof. It is pointed out that the movable vertical post 13, the control housing 16, and the upper and lower boom members are rotatable as a unit about a vertical axis type defined by the fixed post 13a. Although not shown in the drawing, means for the revolving the movable vertical post, the control housing, and the upper and lower boom members comprises a hydraulic pump located in the housing.

The boom assembly is provided with a cutting mechanism, which, in the embodiment shown, comprises a chain saw assembly 63. Means are provided for mounting the chain saw assembly on the outer end of the upper boom member, and this means includes a cylindrically shaped pin 33 fixed to the upper boom member adjacent to the outer end thereof and projecting laterally therefrom. An attachment mechanism is also provided for interconnecting the chain saw assembly 63 with the upper boom member 22 and this attachment mechanism includes collar 24 disposed in coaxial relation around the pin 33. A suitable cotter type retainer clip 33a extends through an opening in the pin 33 and retains the collar in mounted relation on the pin. The collar 34 has a depending arm 35 fixedly connected therewith and projecting downwardly therfrom. A transverse arm 36 is integrally formed with the depending arm 35 and projects laterally therefrom. The transverse arm 36 has an ear 37 extending angularly therefrom, while the depending arm 35 has an ear 38 projecting angularly therefrom, as best seen in FIGS. 2 and 3.

A double acting hydraulic cylinder 39 is provided with a pair of ears 40 at one end thereof, which are connected by pivot 41 to a bracket 42, the latter being fixed to the upper boom member 22 adjacent the outer end thereof. The hydraulic cylinder 39 is provided with a piston therein, to which is connected a piston rod 43 having a pair of ears 44 fixedly connected with the outer end thereof. The ears 44 are pivotally to the ear 38 affixed to depending arm 35 by means of a pivot 45.

A double acting hydraulic cylinder 46 is pivotally connected to the ear 37 on the transverse arm 36 by means of a pivot 47. The cylinder 46 has a piston movable therein, to which is connected piston rod 48, the latter having a pair of ears 49 fixedly connected to the outer end thereof. The ears 49 are pivotally connected to an ear 52a, which projects laterally from the housing 52. In the embodiment shown, the housing 52 is a component of the chain saw assembly 63. The depending arm 35 has a pivot pin 53 fixed thereto and projecting downwardly therefrom, the pin projecting through an opening in the housing 52.

Referring now to FIG. 4, it will be noted that the lower end portion of the pin 53 has an enlarged head 54 and is also provided with suitable bearings 55 to permit the housing to be shifted relative to the descending arm 35 and the upper boom member 22. It will, therefore, be seen that when the piston rod 43 is extended and retracted, the chain saw mechanism will be vertically swung about a pivotal axis defined by the pin 33. It will further be seen that when the piston rod 48 is extended and retracted, the chain saw mechanism will be swung in a horizontal direction about a pivotal axis defined by the pivot pin 53. It will be noted that the pivotal axis defined by the pivot pin 33 and the pivotal axis defined by the pivot pin 53 are disposed normal to each other.

The housing 52 serves to support a reversible rotary hydraulic motor 56, which is secured to the inner sidewall of th housing by suitable bolts 56a. The hydraulic motor is connected by a pair of elongate flexible conduits 57 to a source of hydraulic fluid under pressure, and, in the embodiment shown, are contained within the control housing 16 of the boom assembly 11. The output shaft of the hydraulic motor 56 is provided with a gear 58, which meshingly engages a sector gear 59. The sector gear 59 is affixed to one end of an elongate support arm 60, which also constitutes a component of the chain saw assembly 63. It will be noted that the support arm 60 is journaled in suitable bearings 61, which are mounted on the housing 52. It will further be noted that the sector gear 59 has teeth extending through an arc thereof of 180° and is provided with shoulders or stops 59a at the end of the teeth portion of the gear.

It will be noted that the support arm 60 is of tubular construction to permit conduits 62 to extend therethrough for connection to the hydraulic motor 64 of the chai saw assembly 63. The chain saw 63 is of conventional construction and includes a guide bar 65, about which is trained a chain 67, the latter having cutting teeth 68 affixed thereto. The chain is also trained about a sprocket 66, which is affixed to the output shaft of the hydraulic motor 64, as best seen in FIG. 1. It will be seen that when the hydraulic motor 64 is energized, the chain of the chain saw will be driven. Similarly, when the hydraulic motor 56 is energized in one direction, the chain saw support arm 60 will be rotated in the same direction to revolve the chain saw assembly about its longitudinal axis. By reversing the hydraulic motor 56, the chain saw may be rotated in the opposite direction.

In operation, the conventional operator receptacle will be removed from the boom assembly and the cutting device will be removed from the boom assembly and the cutting device will be mounted thereon. The operator may operate the entire boom assembly, as well as the cutting device, while standing on the ground. By manipulating controls, the boom assembly may be adjusted by extending and retracting hydraulic cylinders 25 and 30 as selectively desired. Thereafter, the operator may energize the hydraulic motor 64 to drive the chain saw and permit the cutting action to take place. When it is desired to manipulate the support arm 60 of the chain saw assembly, the operator will selectively extend or retract piston rods 43 or 48 to permit horizontal swinging movement of the support arm about a pivotal axis defined by the pivot pin 53 or a vertical swinging movement of the support arm about an axis defined by the pivot 33. The chain saw assembly may also be rotated longitudinally about its own axis to permit tilting of the chain saw to a desired angle by energizing the hydraulic motor 56 in a predetermined direction. The support arm 60 and the upper boom 23 may be moved as a unit by extending or retracting hydraulic cylinder 25.

Thus, it will be seen from the foregoing description that I have provided a boom assembly with a cutting device, which may be manipulated by an operator at a remote position with power means about various pivotal axes, which, in effect, define a universal joint type connection. It is pointed out that other types of cutting devices, such as power shears and the like, may also be used.

Thus, it will be seen that I have provided a novel cutting device in combination with a vehicle mounted boom assembly, which is not only of simple and inexpensive construction, but one which functions in a more efficient manner than any heretofore known comparable device.

What is claimed is:

1. A vehicle mounted boom assembly mounted on a vehicle and including a support structure,
    an elongate lower boom having one end thereof pivotally mounted on said support structure for vertical movement relative thereto,
    an upper boom member having one end thereof pivotally connected to the other end of said lower boom member for vertical pivotal movement therebetween,
    a pair of crank arms fixedly connected to one of said boom members and being pivotally connected together,
    power means mounted on said lower boom member and being connected with said crank arms for shifting said upper boom member relative to said lower boom member,
    a support bracket pivotally mounted on said upper boom member adjacent the other end thereof for swinging movement of the bracket relative to said upper boom member about a first axis,
    a first hydraulic piston and cylinder mounted on said upper boom member and being connected with said support bracket for shifting the latter about said first axis, a housing pivotally connected to said bracket for said pivotal movement relative to said bracket about a second axis disposed substantially normal to said first axis, a second hydraulic and piston cylinder mounted on said bracket and connected with said housing for shifting the housing relative to said bracket about said second axis, an elongate tubular support arm having one end thereof projecting into said housing and extending longitudinally therefrom, said tubular support arm being revolvable about its longitudinal axis relative to said housing, an elongate chain saw assembly mounted on the outer end of said tubular arm, and a power shifting mechanism in said housing operatively interconnected with said tubular support arm and being operable for rotating the support arm about its longitudinal axis.

* * * * *